Dec. 18, 1962     R. LEE     3,069,577
DISC ROTOR FOR INDUCTION MOTOR
Filed Nov. 4, 1959
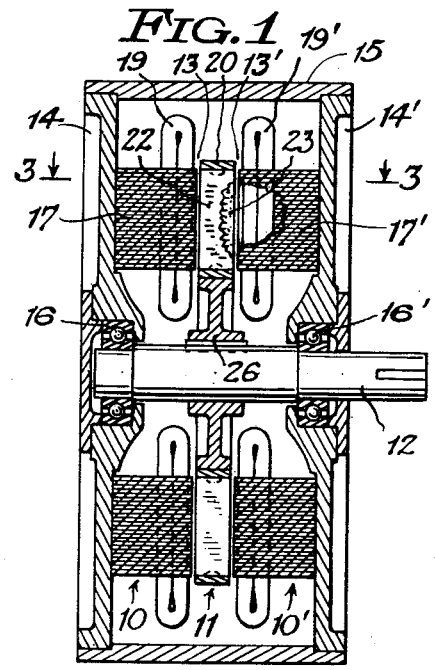
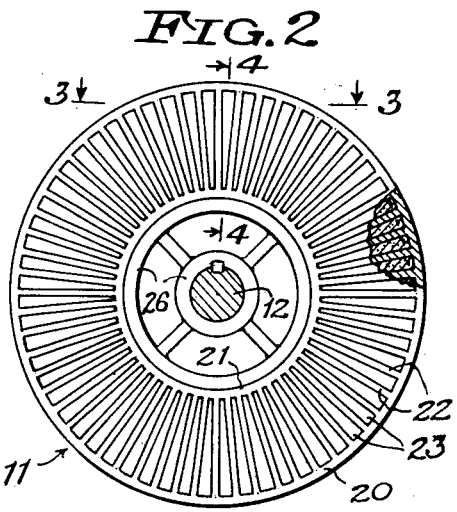
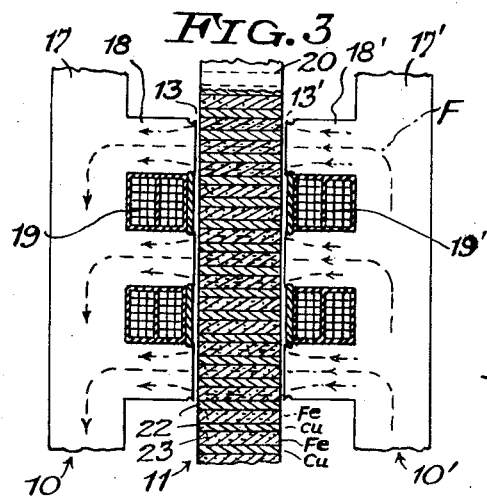
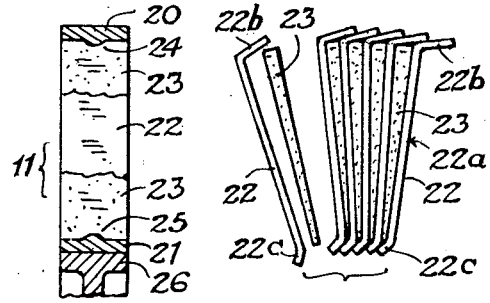
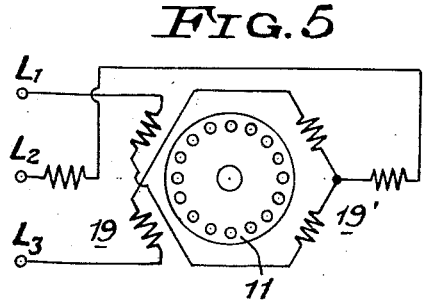
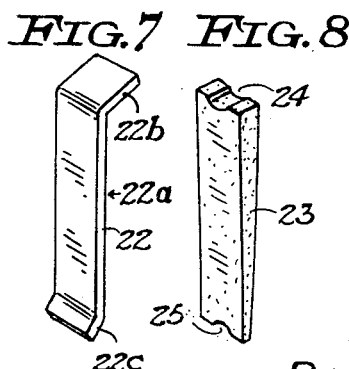
INVENTOR.
ROYAL LEE
BY Christopher L. Waal
ATTORNEY United States Patent Office 3,069,577
Patented Dec. 18, 1962

3,069,577
DISC ROTOR FOR INDUCTION MOTOR
Royal Lee, Elm Grove, Wis., assignor to Lee Foundation for Nutritional Research, Milwaukee, Wis., a corporation of Wisconsin
Filed Nov. 4, 1959, Ser. No. 850,895
6 Claims. (Cl. 310—166)

This invention relates to induction motors of the general type having a squirrel-cage disk rotor disposed between a pair of axial-pole stator elements, and further relates to a method of making squirrel-cage disk rotors for such motors.

An object of the invention is to provide an improved and efficient axial air-gas induction motor having a pair of stator elements and an intervening squirrel-cage disk rotor through which stator flux passes axially from one stator element to the other and which is so constructed and arranged as to prevent or minimize shunting or short-circuiting of stator flux between stator teeth.

Another object is to provide an axial-pole induction motor in which the disk stator is of relatively light weight, thus facilitating starting and stopping of the motor and reducing starting current.

A further object is to provide an improved and simplified method of making squirrel-cage disk rotors for axial-pole induction motors.

The invention further consists in the several features hereinafter described and claimed.

In the accompanying drawing:

FIG. 1 is a longitudinal sectional view of an induction motor of the double air-gap disk rotor type constructed in accordance with the invention;

FIG. 2 is a face view of the disk rotor, parts being shown in section;

FIG. 3 is a fragmentary developed sectional view of the motor, taken generally on the line 3—3 of FIGS. 1 and 2;

FIG. 4 is a fragmentary detail sectional view of the disk rotor, taken generally on the line 4—4 of FIG. 2;

FIG. 5 is a wiring diagram of the motor;

FIG. 6 is a detail side view showing some of the rotor parts before they are joined to form the rotor;

FIG. 7 is a perspective view of one of the rotor conductor bar elements before assembly, and FIG. 8 is a perspective view of one of the rotor core elements.

In the drawing, there is shown an induction motor of the invention comprising a pair of axially spaced axial-pole stator elements 10 and 10' and an intervening disk rotor 11, hereinafter more fully described, rigidly mounted on a shaft 12. The rotor is separated from the spaced stator elements by two axial air-gaps 13 and 13' at opposite sides of the rotor, the air-gaps extending in parallel planes normal to the axis of rotation of the rotor, so that stator flux will pass axially from one stator element to the other through the intervening disk rotor and air gaps.

The two coaxial stator elements 10 and 10' are mounted in a motor housing or frame comprising a pair of axially spaced end frame members 14 and 14' and a tubular ring member 15 which connects the marginal portions of these frame members. The rotor shaft 12 is journalled in ball-bearings 16 and 16' carried in the end frame members.

Each of the stator elements 10 and 10', which are of conventional type and identical construction, comprises an annular core 17 or 17' formed of spirally wound magnetizable ribbon stock, the core being rigidly secured at its back end to the inner face of the associated end frame member 14 or 14', and the front end of the core being radially slotted to form stator teeth 18 or 18' and to carry a primary winding 19 or 19', preferably of a three-phase type, the corresponding teeth of the two stator cores being in axial alignment. The three-phase stator windings are supplied with power from line conductors $L_1$, $L_2$, and $L_3$ as shown in the conventional wiring diagram of FIG. 5. The stator windings 19 and 19' are so connected as to provide opposite poles at the opposite teeth of the stator cores, thus insuring the proper axial flow of magnetic flux through the rotor, as indicated by F in FIG. 3, and also minimizing axial thrust on the rotor. By way of example, the corresponding phases of the two stator windings are shown to be connected in series. In some instances, the stator cores may be provided with two-phase or single-phase windings.

The disk rotor 11 comprises concentric outer and inner end rings 20 and 21 of non-magnetic metal, such as copper or aluminum, which are connected by spoke-like conductor bars 22 of the same metal to form a squirrel-cage secondary winding. The conductor bars 22 extend substantially radially and are formed by metal straps or ribbons which are preferably of uniform width and thickness, the width of the straps extending in an axial direction, and their thickness extending in a peripheral direction. The narrow spaces between the conductor bars are occupied by thin radially extending core bars or strips 23 of suitable rolled, cast or sintered magnetizable material such as silicon steel or wrought iron. If desired, the magnetizable material may be oriented to provide a maximum permeability in an axial direction. The rotor core bars 23 are of rectangular cross-section and are wedge-shaped or tapered in a longitudinal direction to fill the spaces between the conductor bars. The opposite ends of the core bars have anchor notches 24 and 25 into which parts of the end rings fit for rigidly securing these bars in place. The opposite edges of the conductor bars, core bars, and end rings present flat parallel faces normal to the rotor axis. The thickness of each conductor bar and core bar is substantially smaller than its width and is also substantially smaller than the stator tooth width. Preferably, each conductor bar and core bar has a thickness substantially less than one-half the stator tooth width. The inner end ring 21 of the rotor is welded or otherwise rigidly secured to a hub member 26 which is keyed to the rotor shaft 12. While the number of rotor conductor bars is here shown to be a multiple of the number of stator teeth, this relation may be varied slightly if necessary to avoid a cogging effect.

In the operation of the motor, the alternating magnetic flux passes from the teeth of one stator core straight through the rotor disk 112 by way of the rotor core bars 27 to the teeth of the other stator core and then in a circumferential direction along the back portion of the second stator core, returning axially through the rotor to the first stator core. The rotating magnetic field induces alternating voltages in the squirrel-cage rotor, causing rotor currents to flow which react with the axially extending field flux to exert a torque on the rotor.

The construction of the rotor is such that the rotating field flux produced in the stator elements during operation of the motor will pass in an axial direction straight through the narrow rotor cores from one set of stator teeth to the other set of stator teeth, and there will be substantially no flux passing in the rotor in a circumferential direction, and no shunting, bridging, or short-circuiting of flux between adjacent rotor teeth of either stator core, or between angularly offset teeth of the opposite stator cores, thus improving the efficiency of the motor.

The axial thrust on the rotor is negligible, so that the motor bearings are not required to resist any appreciable axial load. The relatively light weight rotor will substantially reduce the starting current for the motor and permit rapid starting and stopping of the motor. The construction of the motor is such that for a given power rating the motor is of a relatively small size.

In fabricating the rotor, each conductor bar 22 is formed by the intermediate part of a strap-like blank 22a, FIGS. 6 and 7, the opposite ends of which are bent in opposite directions to form diagonally extending tongues or lips 22b and 22c. The tapered core bars 23 are sandwiched between the conductor bars or straps to form a disk-like assembly, the end tongues 22b and 22c of the conductor bars being disposed in lapping relation, and the assembly being placed in a suitable welding jig, not shown. The lapping outer tongues 22b are then welded together to form the outer end ring 20, and the lapping inner tongues 22c are similarly welded together to form the inner end ring 21. During the welding operation the notched opposite ends of the core bars will become firmly anchored in place by liquid metal flowing therein. If necessary, welding metal can be added to the lapping tongues to form relatively smooth surfaces on the end rings. The welding is preferably effected by a gas-shielded process, such as the "Heliarc" process. The end rings of the rigid rotor disk are then dressed or machined to the desired dimensions, and the inner end ring is suitably secured, as by welding, to the hub member 26. If necessary, the rotor is then balanced.

I claim:

1. In an axial-pole induction motor of the type including a pair of axially spaced wound stator elements having respective annular cores with confronting lateral teeth in axial alignment, a squirrel-cage disk rotor disposed between said toothed stator cores with air-gaps therebetween, said rotor including radiating non-magnetic conductor bar members of elongated cross-section connected to outer and inner end rings and further including radiating magnetizable filler members between said conductor bar members, the width of said bar members extending in an axial direction, and the thickness of each conductor bar member and magnetizable filler member extending in a peripheral direction and being substantially smaller at said air-gaps than the width of the stator teeth.

2. In an axial-pole induction motor of the type including axially spaced annular stator cores with respective primary windings and with confronting lateral teeth in axial alignment, a squirrel-cage disk rotor disposed between said toothed stator cores with air-gaps therebetween, said rotor including radiating non-magnetic conductor bar members of generally rectangular elongated cross-section connected to outer and inner rings and further including radiating magnetizable filler members between said conductor bar members, the width of said bar members and filler members extending in an axial direction, and the thickness of said members extending in a peripheral direction and being substantially smaller at said air-gaps than the width of said members and the width of said stator teeth.

3. A squirrel-cage disk rotor for a double air-gap axial-pole induction motor, comprising radiating non-magnetic conductor bar members of generally rectangular elongated cross-section having their width extending in an axial direction and having their edges at the opposite faces of the rotor, outer and inner end rings connected to said conductor bar members, and radiating magnetizable filler members of generally rectangular elongated cross-section interposed between said conductor bar members and extending to the opposite faces of the rotor, the space between adjacent conductor bar members being of the same order of size as the thickness of said conductor bar members.

4. A squirrel-cage disk rotor for a double air-gap axial-pole induction motor, comprising radiating non-magnetic conductor bar members of elongated cross-section having their width extending in a axial direction outer and inner end rings connected to said conductor bar members, and radiating wedge-shaped magnetizable filler bar members of elongated cross-section interposed between said conductor bar members and extending to the opposite faces of the rotor, the opposite ends of said magnetizable filler bar members being notched and interengageable with projecting parts of said end rings.

5. A squirrel-cage disk rotor for a double air-gap axial-pole induction motor, comprising a series of radiating non-magnetic strap-like conductor bar members having their width extending in an axial direction, said conductor bar members having bent outer and inner end portions respectively united to form outer and inner end rings, and magnetizable filler members interposed between said conductor bar members and extending to the opposite faces of the rotor.

6. In an axial-pole induction motor, primary stator means including axially spaced annular stator cores at least one of which has lateral teeth forming a polar portion thereof, and a squirrel-cage disk rotor disposed between said stator cores with air-gaps therebetween, said rotor including radiating non-magnetic conductor bar members of elongated cross-section connected to outer and inner end rings and further including radiating magnetizable members between said bar members, the width of said conductor bar members extending in an axial direction, and the pitch of said conductor bar members being substantially smaller than the width of the stator teeth.

References Cited in the file of this patent

UNITED STATES PATENTS

| | | |
|---|---|---|
| 427,978 | Dolivo-Dobrowolsky | May 13, 1890 |
| 2,483,024 | Roters | Sept. 27, 1949 |
| 2,543,639 | Merrill | Feb. 27, 1951 |
| 2,550,571 | Litman | Apr. 24, 1951 |
| 2,740,910 | Fleischer | Apr. 3, 1956 |
| 2,763,916 | Korski | Sept. 25, 1956 |